Figure 1:
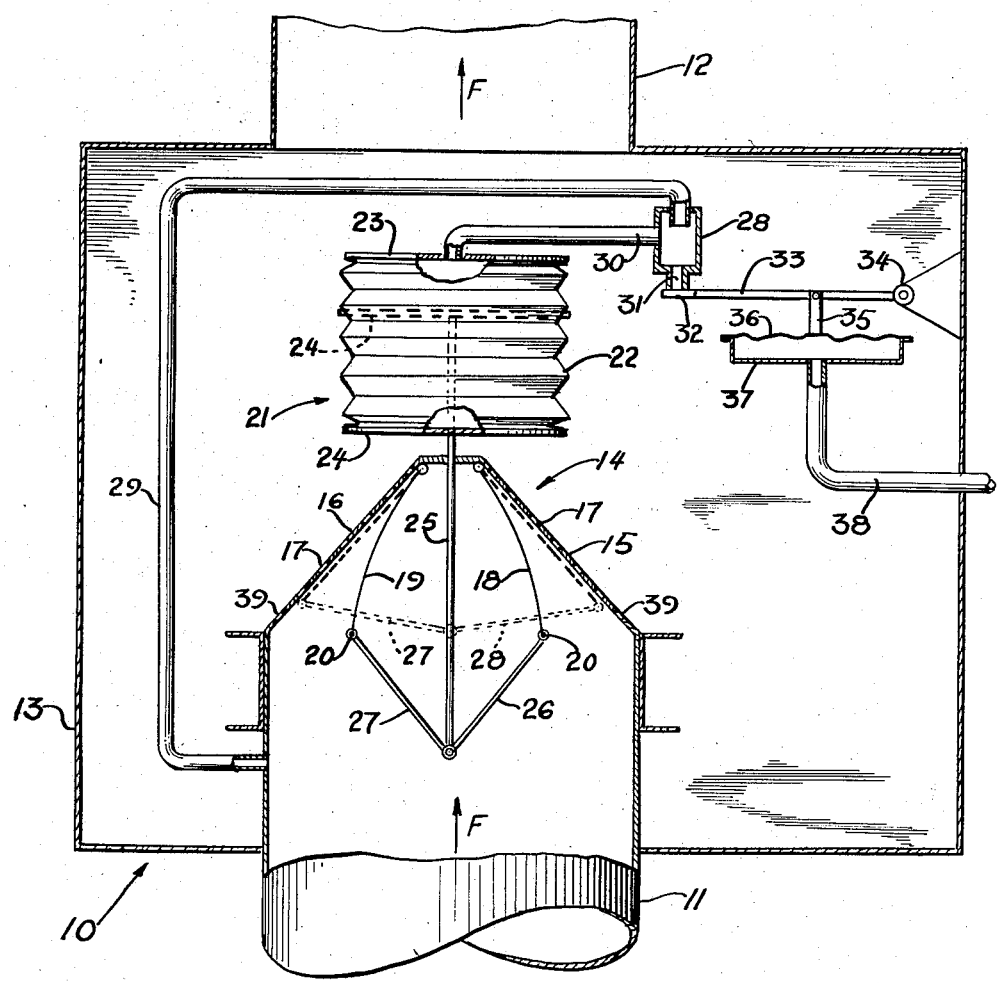

Sept. 29, 1959     J. W. KREUTTNER     2,906,287
FLOW CONTROL DEVICE

Filed Sept. 20, 1955     2 Sheets-Sheet 1

INVENTOR
JOSEPH W. KREUTTNER
BY
Pollard Johnston Smythe & Robertson
ATTORNEYS

Sept. 29, 1959

J. W. KREUTTNER 2,906,287

FLOW CONTROL DEVICE

Filed Sept. 20, 1955

2 Sheets-Sheet 2

INVENTOR
JOSEPH W. KREUTTNER
BY
Pollard Johnston Smythe Robertson
ATTORNEYS

2,906,287

FLOW CONTROL DEVICE

Joseph W. Kreuttner, North Tarrytown, N.Y., assignor to Buensod-Stacey, Incorporated, New York, N.Y., a corporation of Delaware Application September 20, 1955, Serial No. 535,454

13 Claims. (Cl. 137—489)

This invention relates generally to flow control devices, and is particularly directed to devices for controlling, or maintaining constant, the rate of fluid flow through ducts, for example, the air delivery ducts extending from central air conditioning apparatus to a plurality of individual distributing units.

It is well known that variations of fluid pressure in a fluid distribution line or duct result in an inconstant or varying rate of flow therethrough. In air conditioning systems, particularly those employing a central air conditioning apparatus from which air is delivered to a plurality of individual distributing units, pressure variations in the air delivery lines or ducts occur frequently by reason of the irregular and changing demand for air in the rooms being conditioned, and consequent changes in the rate of air flow through the delivery ducts contribute to the creation of objectionable audible noises that commonly accompany the operation of existing air conditioning systems.

Although various types and constructions of flow control devices have been proposed, wherein the effective size of an orifice in a duct or line is controlled in response to the fluid pressure in the latter, it is an object of the present invention to provide a flow control device of improved sensitivity for reliably maintaining a substantially constant rate of air flow in the delivery ducts of air conditioning systems, wherein large volumes of air are handled under frequently varying pressures.

Another object is to provide a flow control device which defines an opening of variable area interposed in the air delivery duct, and wherein the effective size of such opening is controlled in response to static pressure variations at the downstream side of the variable opening so that the rate of air flow to the points of utilization is maintained substantially constant without regard to changes in the pressure of the air supplied to the delivery duct.

Still another object is to provide a flow control device which is capable of maintaining a constant rate of flow through a delivery duct of a mixture of fluids, for example, heated and cooled air, supplied through two or more supply ducts.

A further object is to provide a flow control device which defines a variable area opening in the line or duct carrying the flow to be controlled, and includes a flow control member for varying the effective area of the opening and a sensitive control system operative to regulate the relationship of the flow control member to the opening in response to certain pressure conditions in the flow through the duct.

One form that the invention may take is characterized by the provision of at least one perforated plate defining the variable area opening in the delivery duct and having a flexible, substantially imperforate curtain disposed at its upstream side. The plate and curtain are arranged so that the latter normally diverges from the plate to uncover the perforations, while the pressure head of the flow tends to move the curtain against the plate for progressively closing the perforations, thereby to vary the effective area of the opening. However, the movement of the curtain toward the perforated plate is controlled by a pressure responsive mechanism, the movable member of which is located within the duct at the downstream side of the perforated plate and responds to the pressure difference between the pressure within the unit and the conditioned space. The pressure responsive mechanism is arranged so that, as the pressure within the unit increases in relation to the pressure in the room, power is provided through a motor to move the curtain away from the perforated plate to increase the effective area of the opening in the duct, while, conversely, a decrease in the differential between the above related pressures, permits the curtain to be moved by the pressure head of the flow toward the perforated plate for progressively closing the perforations of the latter. The pressure acting upon the motor or bellows is derived from the air supply system at the upstream side of the perforated plate. A pilot arrangement is operated by the pressure responsive means to control the pressures within the motor or bellows. Such a pilot arrangement may be reverse or direct acting as desired.

Figure 2:
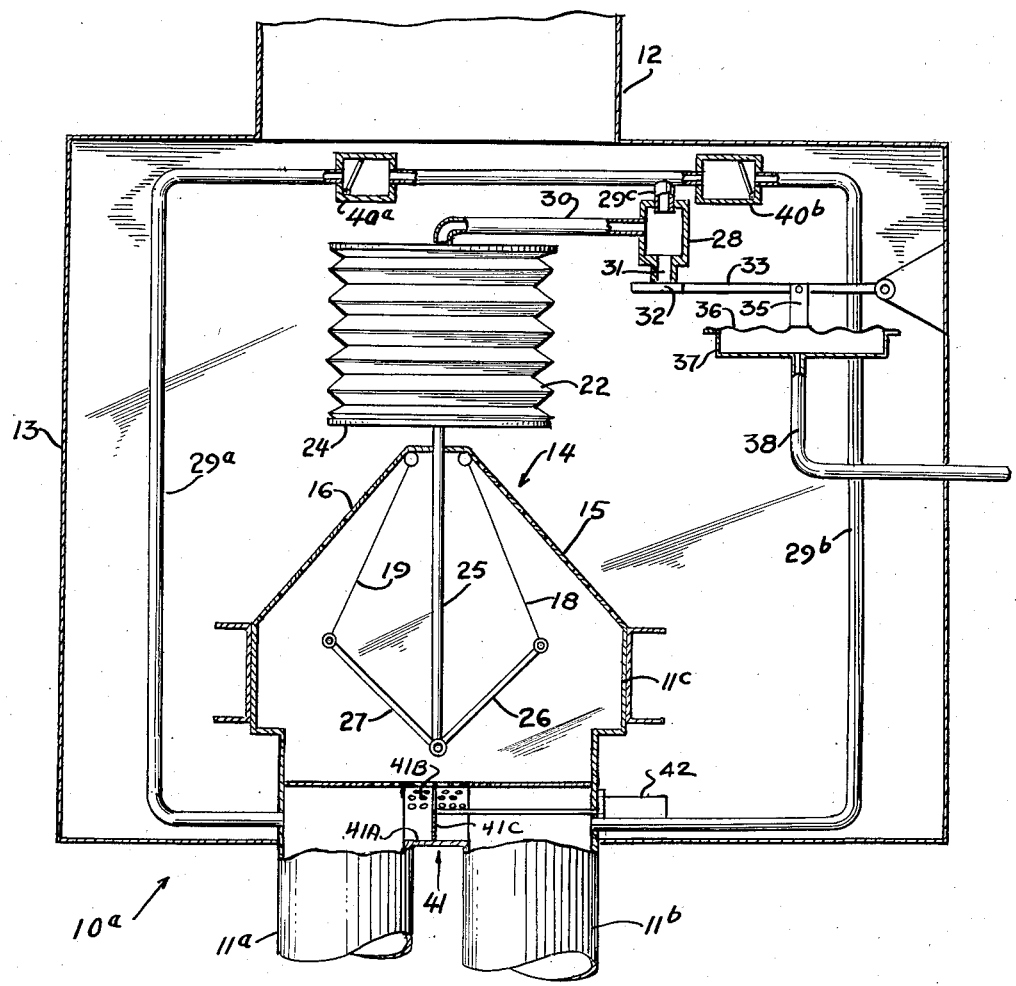

The above, and other objects, features and advantages of the invention, will be apparent in the following detailed description of illustrative embodiments, which description is to be read in connection with the accompanying drawing, wherein:

Fig. 1 is a vertical, longitudinal section through a duct having a flow control device therein which embodies the present invention; and Fig. 2 is a view similar to Fig. 1, but showing another embodiment of the invention.

Referring to the drawing in detail, and initially to Fig. 1 thereof, a flow control device embodying this invention is there generally identified by the reference numeral 10 and is shown interposed in a duct which includes an inlet section 11 and an outlet or discharge section 12. Although either a liquid or gas may flow through the duct sections 11 and 12 and be controlled by the device 10, the latter is particularly adapted for use in the delivery ducts of air conditioning systems which deliver either cooled air, or a mixture of heated and cool air, from a central conditioning apparatus to a plurality of distributing units. In Fig. 1, as well as in Fig. 2 which will be referred to in detail hereinafter, the direction of the fluid flow through the delivery duct and the flow control device is indicated by the arrows F.

The flow control device 10 includes a housing 13 having the inlet section 11 of the associated delivery duct projecting upwardly therein, while the outlet or discharge section 12 of the duct also opens into the interior of the housing 13. A perforated plate, generally identified by the numeral 14, extends across the end of inlet duct 11 within the housing 13 and includes inclined flat sections 15 and 16 which converge upwardly toward the center of the duct section. The perforations 17 of the plate 14 define an opening between the duct sections 11 and 12, the effective area of that opening being variable by closing and uncovering of the perforations so that the rate of flow of the fluid from inlet duct section 11 into outlet duct section 12 can thereby be controlled.

In the form of the invention shown in Fig. 1, the effective area of the opening defined by the perforations of plate 14 is controlled or determined by flexible, substantially imperforate curtains 18 and 19 which cooperate with the sections 15 and 16, respectively, of the perforated plate and are substantially coextensive with the perforated zones of the related plate sections. The curtains 18 and 19 are disposed at the upstream sides of the plate sections 15 and 16 and are suspended at their upper edges along the upper edges of the related plate sections so that the curtains tend to hang more or less vertically within the duct section 12 and thereby diverge from the plate sections 15 and 16 to normally uncover all of the perforations 17 of the latter. It is apparent that the pressure head of the fluid flow from the inlet duct section 11 into the outlet duct section 12 tends, more or less, to swing the curtains 18 and 19 away from their normal depending positions toward the related perforated plate sections 15 and 16, respectively. Preferably, the lower edges of the curtains 18 and 19 are weighted, for example, by stiffening rods 20, so that the pressure head of the flow acting against the curtains urges the latter to billow outwardly away from each other, as shown in Fig. 1, and to contact progressively increasing areas of the related perforated plate sections, starting at the top of the latter, corresponding to increases in the pressure head of the fluid flow. Thus, as the pressure head of the fluid flow increases and gives rise to an increase in the rate of flow through the outlet duct section 12, the curtains 18 and 19 are urged by the increased pressure head into contact with proportionately increased areas of the perforated zones of the plate sections 15 and 16, respectively, thereby decreasing the effective area of the opening defined by the plate 14 and correspondingly decreasing the rate of flow through the outlet section 12.

Although the pressure head of the flow acting against the curtains 18 and 19 urges the latter in the directions towards the related plate sections 15 and 16, it has been found that, for certain installations, the relationship between changes in the perforated areas of the plate sections covered by the curtains and the changes in the pressure head under varying flow conditions is not sufficiently accurate or sensitive to maintain a constant rate of flow through the outlet duct section 12. Accordingly, the flow control device 10 embodying this invention includes a bellows actuated control for the curtains 18 and 19. The bellows actuated control is generally identified by the reference numeral 21 and includes a pressure actuated motor or bellows 22 mounted within the housing 13, that is, at the downstream side of the perforated plate 14. One end wall 23 of the bellows is fixed or non-movable, while the opposite end wall 24 has a control rod 25 extending therefrom and substantially bisecting the angle between plate sections 15 and 16. Control rod 25 extends slidably through an aperture at the center of the perforated plate 14 and, at its free or lower end, is pivotally connected to links 26 and 27 which are, in turn, pivotally connected to the rods 20 at the lower edges of the curtains 18 and 19, respectively.

The bellows 22 expands and contracts to cause downward and upward movement, respectively, of its movable wall 24 in response to changes in the relation between the pressure acting within the bellows and the pressure in the housing 13. The pressure within the bellows 22 is derived from the static pressure within the inlet duct section 11 at the upstream side of perforated plate 14 or from the air supply, and within bellows 22 is controlled in response to the difference in pressure within the housing 13 and the space being conditioned. As seen in Fig. 1, the static or supply pressure in the inlet duct 11 is communicated to the casing of a bleed valve 28 through a conduit 29 which, at its opposite ends, opens through a side wall of duct section 11 and into valve 28. A conduit 30 extends from the casing of bleed valve 28 and opens into the interior of bellows 22, for example, through the fixed end wall 23 of the latter. A bleed or escape passage 31 opens from the casing of valve 28, and the escape of fluid through the passage 31 is controlled by a plate valve 32 which is carried by a lever 33 at one of the ends of the latter. The lever 33 is rockably supported, as at 34, and is connected, for example, by a link 35, to a resilient pressure responsive means such as diaphragm 36. Diaphragm 36 extends across a casing 37 within housing 13. The interior of the casing 37 is connected to the space being conditioned, for example, by conduit 38. Thus, the pressure responsive diaphragm 36 is subject, at its lower side, to space pressure and, at its upper side, to the pressure within housing 13.

With the arrangement illustrated in Fig. 1, an increase in the pressure within the housing 13 moves the diaphragm 36 downwardly to unseat the valve 32, while a decrease in the pressure within the housing 13 results in upward movement of the resilient diaphragm toward its normal or unstressed position and the valve 32 increasingly closes the bleed passage 31.

It is apparent that the extent to which the curtains 18 and 19 are free to be urged by the pressure head of the fluid flow against the related plate sections 15 and 16 for closing more or less of the perforations in the latter is determined, at any instant, by the axial position of the control rod 25. Assuming that the positions of the bellows 22, rod 25, links 26 and 27, and curtains 18 and 19, shown in full lines on Fig. 1, initially provide the desired rate of flow through the outlet duct section 12, and that thereafter the pressure within the housing 13 increases, for example, by reason of a decrease in the demand for fluid at the point of utilization served by the duct section 12 or an increase in the pressure of the flow supplied to the inlet duct section 11, it is apparent that the increased pressure in the housing 13 will displace the diaphragm 36 in the direction for unseating the plate valve 32 from the bleed passage 31. The opening of the bleed passage 31 will serve to decrease the pressure communicated through the conduits 29 and 30 and the bleed valve 28 to the interior of the bellows 22, whereby the change in the differential between the pressures inside and outside of the bellows will be boosted or accentuated and the bellows contracts, for example, to the condition disposing its movable wall 24 in the raised position shown in broken lines on Fig. 1. The upward movement of wall 24 of the bellows will raise the control rod 25, so that the links 26 and 27 are extended, for example, as shown in broken lines on Fig. 1, and the related curtains 18 and 19 are then free to be moved, by the pressure head of the flow, into contact with the plate sections 15 and 16 over increased areas of the latter for closing the perforations in such areas and thereby reducing the flow from the inlet duct section 11, through the plate 14 and into the outlet duct section 12. If, following the above operation, the demand for fluid from the duct section 12 increases, or the pressure of the flow supplied to the inlet duct section 11 is decreased, to cause a decrease in the pressure within the housing 13, so that the variable opening defined by the uncovered perforations of the plate 14 must be enlarged to maintain a constant pressure and flow through the duct section 12, the decreased pressure within housing 13 permits the resilient diaphragm 36 to return toward its unstressed position and to seat the plate valve 32 for closing the bleed passage 31. Such closing of bleed passage 31 causes the pressure acting within the bellows 22 to rise toward the level of the static pressure in the inlet duct passage 11. Since the perforated plate 14 imposes a restriction between the duct sections 11 and 12, even when all of the perforations of the plate 14 are uncovered, it is apparent that a pressure drop will occur across the plate 14, so that the static pressure within the housing 13, and acting on the outside of the bellows 22, is always less than the static pressure within the inlet duct section. Thus, as the pressure acting within the bellows 22 rises toward the level of the static pressure in inlet duct section 11, the bellows is expanded, and the resulting downward movement of the bellows end wall 24 and control rod 25 causes the links 26 and 27 to pull the lower edges of the curtains 18 and 19 away from the related plate sections 15 and 16 so that increasing numbers of the perforations in the latter are thereby uncovered.

Assuming that the above described movement of the curtains 18 and 19 away from the related plate sections 15 and 16 began with the curtains in contact with the plate sections over their entire areas, it is apparent that the force required to initially separate or peel-off the lower edge portions of the curtains from the plate sections will be substantial. However, as soon as the lower edge portions of the curtains have been separated from the plate sections 15 and 16, the flow through duct section 11 gets between the curtains and the related plate sections and facilitates the further removal or peel-off of the curtains. In order to reduce the force required to effect the initial separation of the curtains from the related plate sections, either the curtains 18 and 19 or the plate sections 15 and 16 may be formed with a minor number of openings which remain free or uncovered even when the curtains completely contact the plate sections so that some flow always occurs through the plate sections. Thus, as shown on Fig. 1, the plate sections 15 and 16 may have a relatively minor number of auxiliary openings 39 which are disposed outside the reach of the curtains 18 and 19. These minor openings also may serve to provide a permanent bypass for air.

Discounting for the moment the action of the diaphragm controlled bleed valve 28 upon the pressure acting within the bellows 22, it would appear that an increase in the static pressure within the inlet duct section 11 might increase the pressure within the bellows 22 to such an extent that the wall 24 of the bellows would move downwardly to cause further peeling-off of the curtains 18 and 19 and an undesirable increase in the effective area of the opening defined by the uncovered perforations of the plate 14. However, such is not the case, since the position of the end wall 24 and of the control rod 25 depends both upon the differential of the pressures inside and outside of the bellows and the effect of the pressure head of the flow upon the curtains 18 and 19. Thus, if at any time the static pressure in duct section 11 is suddenly increased, the increased pressure head acting against the curtains counteracts the suddenly increased pressure within the bellows 22 and avoids further uncovering of the perforations in plate 14 until the diaphragm controlled bleed valve 28 responds to the increasing pressure within the housing 13 to reduce the pressure fed to the interior of the bellows through the conduits 29 and 30. Similarly, when the static pressure within the inlet conduit section 11 is suddenly decreased, the reduced pressure head acting on the curtains avoids any adverse change in the positions of the latter, by reason of the suddenly reduced pressure within the bellows 22, until the diaphragm controlled bleed valve 28 can become effective to cause an increase in the pressure within the bellows.

Although the flow control device 10 has been illustrated in Fig. 1 in association with a single inlet duct section 11 through which a fluid, for example, cooled air, is supplied, and is intended to maintain a substantially continuous flow through the outlet section 12 of the delivery duct, it is to be understood that flow control devices constructed in accordance with the present invention may be employed in installations where two different fluids, for example, heated air and cool air, are mixed together before being supplied to the delivery duct leading to the point of utilization or distribution. Such an installation is illustrated in Fig. 2, and the flow control device embodying this invention is there generally identified by the reference numeral 10a and includes most of the parts described above in connection with Fig. 1, such parts being identified by the same reference numerals.

In place of the single inlet duct section of the installation of Fig. 1, the installation of Fig. 2 includes at least two inlet duct sections 11a and 11b which supply different fluids, for example, heated air and cool air, and open into a mixing chamber 11c within the housing 13. Suitable proportioning valve means or the like, shown schematically at 41 (Fig. 2) may be provided within the duct sections 11a and 11b to control the proportions of the mixture of the respective fluids. Said proportioning valve means may have a connecting tube 41A with apertures 41B therein, such as described, for example, in copending application Serial No. 350,555 filed April 23, 1953. Damper plate 41C will proportion air from ducts 11a and 11b. Damper plate 41C may, for example, be operated by a room thermostat controlling damper motor 42. As seen in the drawing, the plate sections 15 and 16 of the perforated plate 14 form the top wall of the mixing chamber 11c.

In the flow control device 10a, the conduit 29 of the device 10 is replaced by two conduits 29a and 29b extending from the sides of the inlet duct sections 11a and 11b, respectively, and which are joined together and communicate with a common conduit or manifold 29c opening into the casing of the bleed valve 28. Check valve 40a and 40b are interposed in the conduits 29a and 29b, respectively, and are arranged so that the valve 40a will open to permit flow through the conduit 29a when the static pressure in duct section 11a is greater than that within the duct section 11b, while the valve 40b will open to permit flow through the conduit 29b when the static pressure in the duct section 11b is greater than that in the duct section 11a. Thus, the pressure acting within the bellows 22 of the flow control device 10a is the higher of the static pressures in the inlet duct sections 11a and 11b, respectively, as modified by the action of the diaphragm controlled bleed valve 28. In all respects, other than that mentioned above, the flow control device 10a operates in the same manner as has been described in detail in connection with the device 10.

Although illustrative embodiments of the invention have been described in detail herein and shown in the accompanying drawing, such embodiments are merely exemplary, and various changes and modifications may be effected therein without departing from the scope or spirit of the invention, except as defined in the appended claims.

What is claimed is:

1. In a device for controlling fluid flow from at least one inlet duct section into an outlet duct section; the combination including a housing for establishing communication between said inlet duct section and said outlet duct section, a perforated plate disposed within said housing between said inlet and outlet duct sections, at least one flexible, substantially imperforate curtain suspended at the upstream side of said plate and movable from a normal position, where it is spaced from the plate, toward the plate under the influence of the pressure head of the fluid flow to progressively cover the perforations of said plate and thereby decrease the effective area of said opening, power actuated means connected to said curtain and controlling the movement of said curtain relative to said plate, and pressure responsive means within said housing connected to said power actuated means and regulating the conditions imposed on said power actuated means to maintain a constant rate of flow through the housing at the downstream side of said perforated plate.

2. In a device for controlling fluid flow from at least one inlet duct section into an outlet duct section; the combination including a housing for establishing communication between said inlet duct section and said outlet duct section, a plate disposed within said housing between said inlet and outlet duct sections and including at least one inclined section having perforations therein, a flexible, substantially imperforate curtain suspended at the upstream side of said inclined section of said plate and tending to hang in a position diverging from the related inclined section of the plate for uncovering the perforations in said related section, said curtain being urged, by the pressure head of the fluid flow, towards the related perforated section of said plate, thereby to progressively cover said perforations and decrease the effective area of said inlet duct section, bellows actuated means connected to said curtain for controlling the movement of said curtain with respect to the related inclined section of said plate, and pressure responsive means within the housing connected to said bellows means for regulating the pressure conditions imposed on said bellows actuated means to maintain a constant rate of flow through the housing.

3. In a device for controlling fluid flow from at least one inlet duct section into an outlet duct section; the combination including a housing for establishing communication between said inlet duct section and said outlet duct section, a perforated plate disposed within said housing between said inlet and outlet duct sections, at least one flexible, substantially imperforate curtain suspended at the upstream side of said plate and movable, under the influence of the pressure head of a fluid supplied through said inlet duct section, from a free hanging position, where the curtain diverges from said plate and uncovers the perforations of the latter, toward said plate to progressively cover said perforations and thereby decrease the effective area of said opening, bellows actuated means connected to said curtain for controlling the movement of said curtain relative to said plate, and means within said housing and connected to said bellows means responsive to the pressure difference between static pressure, within said housing at the downstream side of said plate and a second pressure to regulate the pressure conditions imposed on said bellows actuated means so that the latter controls said curtain to maintain a constant rate of flow through said perforated plate and into the outlet duct section.

4. In a device for controlling fluid flow from at least one inlet duct section into an outlet duct section; the combination including a housing into which each inlet duct section opens and from which the outlet duct section extends, a plate in said housing having perforated sections arranged so that at least the major portion of any flow of fluid from each inlet duct section into the outlet duct section must pass through the perforations of said plate between said inlet and outlet duct sections, said perforated sections of the plate diverging downwardly and each having a flexible, substantially imperforate curtain suspended at the upstream side of the related perforated section along the upper edge of the latter so that each curtain, when hanging freely, is angularly spaced from the related perforated section to uncover the perforations in the latter, said curtains being urged, by the pressure head of the fluid supplied through each inlet duct section, toward the related perforated section for progressively covering the perforations of the latter, starting at the top of the related section, thereby to vary the effective area of said opening, bellows actuated means connected to said curtains for controlling the movement of each curtain relative to the related section of said plate, and means within said housing responsive to the pressure difference between that within said housing at the downstream side of said plate and ambient pressure to regulate the pressure conditions imposed on said bellows actuated means so that the latter controls said curtains to maintain a constant rate of flow through said plate and into the outlet duct section.

5. In a device for controlling fluid flow from at least one inlet duct section into an outlet duct section; the combination including a housing into which each inlet duct section opens and from which the outlet duct section extends, a plate in said housing having perforated sections arranged so that at least the major portion of any flow of fluid from each inlet duct section into the outlet duct section must pass through the perforations of said plate between said inlet and outlet duct sections, said perforated sections of the plate diverging downwardly and each having a flexible, substantially imperforate curtain suspended at the upstream side of the related perforated section along the upper edge of the latter so that each curtain, when hanging freely, is angularly spaced from the related perforated section to uncover the perforations in the latter, said curtains being urged, by the pressure head of the fluid supplied through each inlet duct section sideways toward the related perforated section for progressively covering the perforations of the latter, starting at the top of the related section, thereby to vary the effective area of said opening, a bellows disposed in said housing at the downstream side of said plate to be exposed, at its outside, to the static pressure there existing, conduit means leading from at least one of the inlet duct sections at the upstream side of said plate, said conduit means extending to said bellows and opening into the interior of the latter, mechanical means connecting said bellows to said curtains to control the movements of the latter relative to said plate in correspondence to the differential between the pressures inside and outside, respectively, of said bellows, and means within said housing and connected to said bellows responsive to pressure difference between that in said housing at the downstream side of said plate and ambient pressure to regulate the pressure supplied to the inside of said bellows by said conduit means so that said bellows controls said curtains to maintain a constant rate of flow through said plate and into the outlet duct section.

6. In a device for controlling fluid flow from at least one inlet duct section into an outlet duct section; the combination including a housing for establishing communication between said inlet duct section and said outlet duct section, a perforated plate disposed within said housing between said inlet and outlet duct sections, at least one flexible, substantially imperforate curtain suspended in the duct at the upstream side of said plate and movable from a normal position, where it is spaced from the plate, toward the plate under the influence of the pressure head of the fluid flow to progressively cover the perforations of said plate and thereby decrease the effective area of said inlet duct section, bellows actuated means connected to said curtain for controlling the movement of said curtain relative to said plate, and means within said housing and connected to said bellows responsive to pressure difference between that within the housing at the downstream side of said plate and pressure outside of said housing to regulate pressure conditions imposed on said bellows actuated means so that the latter controls the curtain to maintain a constant rate of flow through said plate and the housing.

7. In a device for controlling fluid flow from at least one inlet duct section into an outlet duct section; the combination including a housing for establishing communication between said inlet duct section and said outlet duct section, a perforated plate disposed within said housing between said inlet and outlet duct sections, at least one flexible, substantially imperforate curtain suspended at the upstream side of said plate and movable from a normal position, where it is spaced from the plate, toward the plate under the influence of the pressure head of the fluid flow to progressively cover the perforations of said plate and thereby decrease the effective area of said inlet duct section, a bellows connected to said curtain and disposed in said housing at the downstream side of said plate to be exposed, at its outside, to the static pressure there existing, conduit means leading from the inlet duct section at the upstream side of said plate to sense the static pressure in the inlet duct section, said conduit means extending to said bellows and opening into the interior of the latter, mechanical means connecting said bellows to said curtain to control the movement of the latter relative to said plate in correspondence to the differential between the internal and external pressures acting on said bellows, and means within said housing and connected to said bellows responsive to a pressure at the downstream side of said plate and regulating the pressure supplied to the interior of said bellows by said conduit means so that said bellows controls said curtain to maintain a constant rate of flow through said plate and the housing.

8. In a device for controlling fluid flow from at least one inlet duct section into an outlet duct section; the combination including a housing for establishing communication between said inlet duct section and said outlet duct section, a perforated plate disposed within said housing between said inlet and outlet duct sections, at least one flexible, substantially imperforate curtain suspended at the upstream side of said plate and movable from a normal position, where it is spaced from the plate, toward the plate under the influence of the pressure head of the fluid flow to progressively cover the perforations of said plate and thereby decrease the effective area of said inlet duct section, bellows actuated means connected to said curtain for controlling the movement of said curtain relative to said plate, conduit means leading from the inlet duct section to sense the static pressure therein, said conduit means extending to the bellows and opening into the interior of the latter, a bleed valve interposed in said conduit means, a diaphragm exposed, at its opposite sides, to atmospheric pressure and to the static pressure within the housing at the downstream side of said plate, respectively, and means linking said diaphragm to said bleed valve so that the pressure supplied to the interior of said bellows through said conduit means is regulated in response to difference between pressure within the housing at the downstream side of said plate and atmospheric pressure to provide control of said curtain by the bellows to maintain a constant rate of flow through said plate and the housing.

9. In a device for controlling fluid flow from at least one inlet duct section into an outlet duct section; the combination including a housing for establishing communication between said inlet duct section and said outlet duct section, a plate disposed within said housing between said inlet and outlet duct sections and including at least one inclined section having perforations therein, a flexible, substantially imperforate curtain suspended in the duct at the upstream side of each inclined section of said plate and tending to hang in a position diverging from the related inclined section of the plate for uncovering the perforations in said related section, said curtain being urged, by the pressure head of the fluid flow, towards the related perforated section of said plate, thereby to progressively cover said perforations and decrease the effective area of said inlet duct section, and means within said housing responsive to pressure in the housing at the downstream side of said plate and operatively connected to said curtain to control the movement of the latter relative to said plate so that a constant flow is maintained through the housing.

10. In a flow control device the combination including a housing, at least two inlet ducts opening into said housing, an outlet duct extending from said housing, a perforated plate in said housing interposed in the flow from said inlet ducts to said outlet duct and defining an opening therebetween, at least one flexible, substantially imperforate curtain suspended at the upstream side of said plate and movable, under the influence of the pressure head in the flows from said inlet ducts, from a normal, free hanging position spaced from said plate and uncovering the perforations of the latter toward said plate to progressively cover said perforations and thereby decrease the effective area of said opening, a bellows connected to said curtain and located in said housing at the downstream side of said plate to be exposed, at its exterior, to the static pressure there existing, conduits leading from said inlet ducts and sensing the static pressures in the related inlet ducts, a manifold leading to the interior of said bellows and having said conduits connected thereto, selective check valve means in said conduits operative to communicate said manifold with the one of said inlet ducts having the highest static pressure therein, mechanical means connecting said bellows to said curtain to control the movement of the latter in correspondence to the differential between the internal and external pressures acting on said bellows, and means connected to said bellows responsive to pressure in said housing at the downstream side of said plate and regulating the pressure supplied through said manifold to the interior of said bellows so that the latter controls the movement of said curtain to maintain a constant rate of flow through said outlet duct.

11. In a device for controlling fluid flow from at least one inlet duct section into an outlet duct section; the combination including a housing into which each inlet duct section opens and from which the outlet duct section extends, a plate in said housing having perforated sections arranged so that at least the major portion of any flow of fluid from each inlet duct section into the outlet duct section must pass through the perforations of said plate which define an opening between said inlet and outlet duct sections, said perforated sections of the plate diverging downwardly and each having a flexible, substantially imperforate curtain suspended at the upstream side of the related perforated section along the upper edge of the latter so that each curtain, when hanging freely, is angularly spaced from the related perforated section to uncover the perforations in the latter, said curtains being urged, by the pressure head of the fluid supplied through each inlet duct section, toward the related perforated section for progressively covering the perforations of the latter, starting at the top of the related section, thereby to vary the effective area of said opening, a bellows connected to said curtains and disposed in said housing at the downstream side of said plate to be exposed, at its outside, to the static pressure there existing, conduit means leading from at least one of the inlet duct sections to sense the static pressure existing in the latter at the upstream side of said plate, said conduit means extending to said bellows and opening into the interior of the latter, mechanical means connecting said bellows to said curtains to control the movements of the latter relative to said plate in correspondence to the differential between the pressures inside and outside, respectively, of said bellows, a bleed valve in said housing interposed in said conduit means, a diaphragm in said housing exposed, at its opposite sides, to atmospheric pressure and to the static pressure in said housing at the downstream side of said plate, respectively, and means linking said diaphragm to said bleed valve so that the pressure supplied to the interior of the bellows is regulated in response to said static pressure at the downstream side of said plate and provides control of said curtains by said bellows to maintain a constant rate of flow through said outlet duct section.

12. In a flow control device, the combination including a housing having an outlet duct extending therefrom, a chamber within said housing having a perforated top wall including two downwardly diverging inclined sections, at least one inlet duct opening into said chamber so that said perforated top wall defines an opening between said inlet and outlet ducts, a flexible, substantially imperforate curtain suspended, at its top edge, within said chamber along the upper edge of each of said inclined sections of the perforated top wall so that each curtain, when hanging free, is angularly spaced from the related inclined section to uncover the perforations in the latter, said curtains being urged laterally apart into contact with increasing areas of the related inclined sections, starting at the top of the latter, in response to the pressure head of the flow supplied to said chamber, thereby to progressively decrease the effective area of said opening between the inlet and outlet ducts, an axially movable control rod bisecting the angle between said inclined sections, links connecting said rod to the lower edges of said curtains so that the axial position of said rod determines the extent to which said curtains can be urged against the related inclined sections, motor means in said housing for actuating said rod, and means in said housing responsive to pressure within said housing at the downstream side of said perforated top wall and controlling said motor means so that said curtains maintain a constant flow through said perforated top wall and into said outlet duct.

13. In a flow control device, the combination including a housing having an outlet duct extending therefrom, a chamber within said housing having a perforated top wall, including two downwardly diverging inclined sections, at least one inlet duct opening into said chamber so that said perforated top wall defines an opening between said inlet and outlet ducts, a flexible, substantially imperforate curtain suspended, at its top edge, within said chamber along the upper edge of each of said inclined sections of the perforated top wall so that each curtain, when hanging free, is angularly spaced from the related inclined section to uncover the perforations in the latter, said curtains being urged laterally apart into contact with increasing areas of the related inclined sections, starting at the top of the latter, in response to the pressure head of the flow supplied to said chamber, thereby to progressively decrease the effective area of said opening between the inlet and outlet ducts, an axially movable control rod bisecting the angle between said inclined sections, links connecting said rod to the lower edges of said curtains so that the axial position of said rod determines the extent to which said curtains can be urged against the related inclined sections, a bellows connected to said rod to actuate the latter and being located in said housing at the downstream side of said perforated wall, conduit means extending from at least one inlet duct, to sense the static pressure in the latter, and opening into the interior of said bellows, and means in said housing responsive to pressure in said housing at the downstream side of said perforated top wall and operative to regulate the pressure supplied to the interior of the bellows through said conduit means so that said bellows controls said curtains, through said rod and links, to maintain a constant flow into said outlet duct.

References Cited in the file of this patent

UNITED STATES PATENTS

| | | |
|---|---|---|
| 2,291,731 | Lake et al. | Aug. 4, 1942 |
| 2,542,279 | Kempton | Feb. 20, 1951 |

FOREIGN PATENTS

| | | |
|---|---|---|
| 897,639 | Germany | Nov. 23, 1953 |